(12) United States Patent
Lin et al.

(10) Patent No.: US 11,046,867 B2
(45) Date of Patent: Jun. 29, 2021

(54) COATING COMPOSITION FOR ENHANCING LIGHT TRANSMITTANCE AND COATING LAYER FORMED THEREFROM

(71) Applicant: ETERNAL MATERIALS CO., LTD., Kaohsiung (TW)

(72) Inventors: Sheng Wei Lin, Kaohsiung (TW); Mao Jung Yeh, Kaohsiung (TW); Chien Chen Wu, Kaohsiung (TW)

(73) Assignee: ETERNAL MATERIALS CO., LTD., Kaohsiung (TW)

( * ) Notice: Subject to any disclaimer, the term of this patent is extended or adjusted under 35 U.S.C. 154(b) by 0 days.

(21) Appl. No.: 15/158,038

(22) Filed: May 18, 2016

(65) Prior Publication Data

US 2016/0340551 A1 Nov. 24, 2016

(30) Foreign Application Priority Data

May 19, 2015 (TW) .................................. 104115996

(51) Int. Cl.
*G02B 1/18* (2015.01)
*G02B 1/11* (2015.01)
(Continued)

(52) U.S. Cl.
CPC ......... *C09D 183/08* (2013.01); *C09D 183/06* (2013.01); *G02B 1/11* (2013.01);
(Continued)

(58) Field of Classification Search
CPC ........... C09D 183/08; G02B 1/11; G02B 1/18
(Continued)

(56) References Cited

U.S. PATENT DOCUMENTS 6,979,704 B1 * 12/2005 Mayer .................... B82Y 30/00
523/220
2002/0014080 A1 2/2002 Robbie et al.
(Continued)

FOREIGN PATENT DOCUMENTS

CN 1412577 A 4/2003
CN 1556774 A 12/2004
(Continued)

OTHER PUBLICATIONS

Machine_English_Translation_CN_103980712_A; Yeh, Mao; Organic and Inorganic Compound Resin, Coating Composition containing same and application thereof; Aug. 13, 2014; EPO; whole document.*

(Continued)

*Primary Examiner* — Tahseen Khan
(74) *Attorney, Agent, or Firm* — Ladas & Parry LLP

(57) ABSTRACT

The present invention relates to a coating composition, which includes:
(A) a polysiloxane resin, including a unit derived from a siloxane monomer, a siloxane oligomer, or a combination thereof; and
(B) inorganic particles, including first $SiO_2$ particles with a particle size ranging from 15 nm to 100 nm, and second $SiO_2$ particles with a particle size ranging from 3 nm to <15 nm.

The present invention further relates to a coating layer for enhancing light transmittance that is formed by the coating composition. According to the present invention, by using at least two types of inorganic particles with specific particle sizes to form a geometric stack, the space of pores can be increased, and therefore, the porosity of the coating layer (Continued)

can be increased, thereby reducing the optical refractive index of the coating layer and achieving an effect of enhancing light transmittance.

16 Claims, 4 Drawing Sheets

(51) Int. Cl.
    *C09D 183/08* (2006.01)
    *C09D 183/06* (2006.01)
    *G02B 1/111* (2015.01)
    *C08K 3/22* (2006.01)
    *C08G 77/14* (2006.01)
    *C08G 77/24* (2006.01)

(52) U.S. Cl.
    CPC .............. *G02B 1/111* (2013.01); *G02B 1/18* (2015.01); *C08G 77/14* (2013.01); *C08G 77/24* (2013.01); *C08K 2003/2241* (2013.01); *C08K 2201/005* (2013.01); *C08K 2201/011* (2013.01); *C08K 2201/014* (2013.01); *G02B 2207/107* (2013.01)

(58) Field of Classification Search
    USPC ........................................................ 428/220
    See application file for complete search history.

(56) References Cited

U.S. PATENT DOCUMENTS

| | | | |
|---|---|---|---|
| 2003/0076596 A1 | 4/2003 | Miyatake et al. | |
| 2004/0157065 A1 | 8/2004 | Miyatake et al. | |
| 2004/0248995 A1 | 12/2004 | Glaubitt et al. | |
| 2005/0221054 A1 | 10/2005 | Kawano et al. | |
| 2007/0195431 A1* | 8/2007 | Asakura | G02B 1/111 359/707 |
| 2009/0068580 A1* | 3/2009 | Rimoto | G03G 9/09716 430/108.11 |
| 2009/0285993 A1* | 11/2009 | Kang | C08G 77/24 427/380 |
| 2009/0286673 A1* | 11/2009 | Omoshiki | B01J 37/0009 502/159 |
| 2009/0286901 A1* | 11/2009 | Vijverberg | C09C 1/3081 523/206 |
| 2010/0092765 A1* | 4/2010 | Hager | B82Y 30/00 428/331 |
| 2010/0110521 A1 | 5/2010 | Kawaguchi et al. | |
| 2010/0174024 A1 | 7/2010 | Du et al. | |
| 2011/0033694 A1 | 2/2011 | Jing et al. | |
| 2012/0276369 A1* | 11/2012 | Jing | B82Y 30/00 428/331 |
| 2012/0285528 A1* | 11/2012 | Takanohashi | C08G 77/20 136/256 |
| 2013/0040126 A1* | 2/2013 | Pett | C09D 1/00 428/312.6 |
| 2013/0071649 A1* | 3/2013 | Hager | C09D 183/06 428/331 |
| 2013/0225760 A1 | 8/2013 | Jing et al. | |
| 2014/0018474 A1* | 1/2014 | Zhou | C09D 5/00 523/457 |
| 2015/0140322 A1* | 5/2015 | Lin | C03C 17/009 428/334 |

FOREIGN PATENT DOCUMENTS

| | | | |
|---|---|---|---|
| CN | 101407589 A | | 4/2009 |
| CN | 101434614 A | | 5/2009 |
| CN | 101538445 A | | 9/2009 |
| CN | 101578343 A | | 11/2009 |
| CN | 102272218 A | | 12/2011 |
| CN | 103980712 A | * | 8/2014 |
| EP | 3366728 A1 | | 8/2018 |
| JP | 2-8273 A | | 1/1990 |
| JP | 2005-171068 A | | 6/2005 |
| JP | 2007156391 A | | 6/2007 |
| JP | 2007-182511 A | | 7/2007 |
| JP | 2007182511 A | * | 7/2007 |
| JP | 2007182511 A | * | 7/2007 |
| JP | 2009-203285 A | | 9/2009 |
| JP | 2011-111558 A | | 6/2011 |
| JP | 2011-153195 A | | 8/2011 |
| JP | 2012-246440 A | | 12/2012 |
| JP | 2014-91780 A | | 5/2014 |
| JP | 2014162918 A | | 9/2014 |
| TW | 201024377 A1 | | 7/2010 |
| TW | 201035586 A1 | | 10/2010 |
| TW | 201130654 A1 | | 9/2011 |
| TW | 1357432 B | | 2/2012 |
| TW | 201434986 A | | 9/2014 |
| TW | 201500203 A | | 1/2015 |
| WO | 03027015 A1 | | 4/2003 |
| WO | 2007/038526 A1 | | 7/2007 |
| WO | WO-2014193572 A1 | * | 12/2014 ............. C09D 5/002 |

OTHER PUBLICATIONS

Machine_English_translation_JP_2007182511_A; Coating Material, Method for Producing the same and Optical Article; Jul. 19, 2007; JPO; whole document.*
Office Action dated Mar. 28, 2016 for Taiwan Application No. 104115996.
Espacenet English abstract of CN 101434614 A.
Espacenet English abstract of TW 200811257 A which corresponds to TW 1357432 B.
Espacenet English abstract of CN 1412577 A.
Espacenet English abstract of TW 201035586 A1.
Espacenet English abstract of TW 201024377 A.
Espacenet English abstract of TW 201434986 A.
Espacenet English abstract of TW 201500203 A.
Espacenet English abstract of TW 201130654 A1.
Espacenet English abstract of TW.
Non-English Japanese Office Action dated Jul. 10, 2017 for Japanese Application No. 2016-100677 with English translation.
Espacenet English abstract of JP 2012-246440 A.
Espacenet English abstract of JP 2014-91780 A.
Espacenet English abstract of JP 2011-153195 A.
Espacenet English abstract of JP 2009-203285 A.
Espacenet English abstract of JP 2005-171068 A.
J-PlatPat English abstract of JP 2-8273 A.
Espacenet English abstract of JP 2007-182511 A.
Espacenet English abstract of JP 2011-111558 A.
Non-English Chinese Office Action dated Apr. 2, 2018 for Chinese Application No. 201610333078.4 and an English translation of the Search Report.
Espacenet English abstract of CN 101578343 A.
Espacenet English abstract of CN 102272218 A.
Espacenet English abstract of CN 101538445 A.
Espacenet English abstract of CN 101407589 A.
Office Action dated Sep. 24, 2018 in corresponding German Patent Application No. 10 2016 208 586.7.
Computer generated English translation of WO03027015.
Japanese Office Action dated Jan. 28, 2020 and an English Translation thereof.
JP 2007156391 A _ English Abstract.
JP 2014162918 A _ English Abstract.
Web page of C4 listed on the Japanese Office Action.

* cited by examiner

COATING COMPOSITION FOR ENHANCING LIGHT TRANSMITTANCE AND COATING LAYER FORMED THEREFROM

BACKGROUND OF THE INVENTION

1. Field of the Invention

The present invention relates to a coating composition for enhancing light transmittance, and more particularly, a coating composition for enhancing light transmittance that includes two types of inorganic particles with different particle sizes, and relates to a coating layer formed therefrom.

2. Description of the Related Art

Due to increasingly serious environmental problems such as energy shortage and greenhouse effect, many countries have been actively developing various alternative energies, among which solar power generation has attracted the most attention in industries. After entering a solar cell assembly through a transparent front panel from the air, the sunlight undergoes photoelectric conversion in a solar cell unit so as to convert the light energy into electric energy for output. However, the electricity generation efficiency of a conventional solar cell assembly is undesirable. The electricity generation efficiency of the most common monocrystalline silicon and polycrystalline silicon solar cell assemblies is about 15%. In other words, these silicon solar cell assemblies can only convert 15% of the sunlight to available electric energy, and the remaining 85% of the sunlight will be wasted or become useless heat. Therefore, how to improve the electricity generation efficiency of a solar cell assembly is always one of the key issues in current researches in the industry.

Light reflection occurs at an interface between two media that have different refractive indexes. For example, when the light vertically enters a substrate (assuming the refractive index thereof is 1.8) from the air (the refractive index is 1), it can be known by using a formula of light transmittance= $(4n_1n_2)/(n_1+n_2)^2$ where $n_1$ and $n_2$ are respectively the refractive index of the air and the substrate, that the light transmittance is about 91.84% and the remaining is an optical loss caused by reflection. Generally, reflected light generated at an interface between a substrate and the air comprises about 4% to 8.5% of the total incident light. In optical assemblies, for example, an imaging system such as a camera lens and a display, light reflection may not only reduce imaging intensity but also produce stray light on the image plane, thereby reducing a contrast ratio and resolution of the image. In a solar cell system, light reflection may reduce the utilization ratio of solar energy. As a result, how to reduce light reflection in a solar cell system is a research direction of developing a high-efficiency solar cell.

The proportion of incident light passing through a solar cell assembly is an important factor that affects the photovoltaic conversion efficiency of the solar cell assembly. At present, a glass substrate that has a high light transmittance and is coated with an anti-reflective film/layer is mostly used at the front side of a solar cell assembly to protect the assembly. Reflection of incident light on a glass substrate and destructive optical interference are reduced by means of adjusting the refractive index or thickness of the glass substrate and the film/layer applied thereon, which increases the amount of incident light entering the assembly, improves the utilization ratio of light and enhances the photovoltaic conversion efficiency of the solar cell.

One or more coating layers can be formed on a substrate by using a conventional anti-reflective coating composition to change the refractive index gradient between the substrate (for a glass substrate, the refractive index is about 1.52) and the air (the refractive index is about 1), thereby reducing the optical loss resulted from the reflected light caused by an excessively great difference of refractive indexes. In the prior art, for a coating material, solid particles added into a resin is used in the industry most widely. However, the refractive index of the solid particles is still high, and therefore, the effect of an anti-reflective coating layer with solid particles is limited. A hollow particle has a hole inside so that the refractive index of the particle can be reduced by the air or resin filled in the hole. However, compared with common solid particles, the process for preparing hollow particles is complex and has a high cost and great difficulty. Therefore, an objective of industrialized production is not easily achieved.

In the prior art, many coating compositions of an anti-reflective film/layer were disclosed. For example, Chinese Patent Application No. 200710170356.X discloses a composition for manufacturing an anti-reflective film which includes a straight-chain siloxane oligomer and a fluorosiloxane monomer; Taiwan Patent No. 1357432 discloses an anti-reflective coating composition, which includes a hydrolytic condensate of alkoxy silane and fluorated alkoxy silane, a particle-type metal fluoride with a refractive index of 1.40 or less, and a liquid chelating agent for enhancing dispersion; and Chinese Patent ZL02146838.9 discloses a solution forming an anti-reflective film, which includes a siloxane oligomer and a compound having a fluoro alkyl structure and a polysiloxane structure.

Additionally, a solar cell assembly that uses a plurality of light collecting units to improve a light collecting effect was disclosed in the art. Main components of the light collecting units include a Fresnel lens and a glass substrate with a heat sink and a frame. However, the above components are all manufactured from glass, and therefore the weight thereof is considerably great, which is not favorable to assembling. Another conventional technology is processing on a glass front panel to manufacture a figured glass with a regular pattern so as to improve the light transmittance. However, such technology needs a precise manufacturing technique, has a high manufacturing cost and is not favorable to large-scale production.

SUMMARY OF THE INVENTION

A main objective of the present invention is to provide a coating composition, including:

(A) a polysiloxane resin, including a unit derived from a siloxane monomer, a siloxane oligomer, or a combination thereof; and (B) inorganic particles, including first $SiO_2$ particles with a particle size ranging from 15 nm to 100 nm, and second $SiO_2$ particles with a particle size ranging from 3 nm to <15 nm.

Another objective of the present invention is to provide a coating layer for enhancing light transmittance formed by the coating composition.

The coating composition of the present invention can effectively enhance light transmittance, and solve the problems in the prior art. Specifically, with the addition of inorganic particles of different sizes, the coating composition of the present invention produces more pores in the resulting coating layer and increases the porosity of the resulting coating layer, thereby reducing the refractive index of the coating layer to 1.21 to 1.25. Therefore, the present invention achieves an anti-reflective effect and enhances the light transmittance. Further, the coating composition of the present invention can be applied on a substrate by using a general coating method for subsequent usage or processing; the manufacturing process thereof is relatively simple and cheap, which effectively simplifies the manufacturing procedure, reduces energy consumption, saves cost, and facilitates industrialized mass production.

PREFERRED EMBODIMENT OF THE PRESENT INVENTION

Figure 1A:
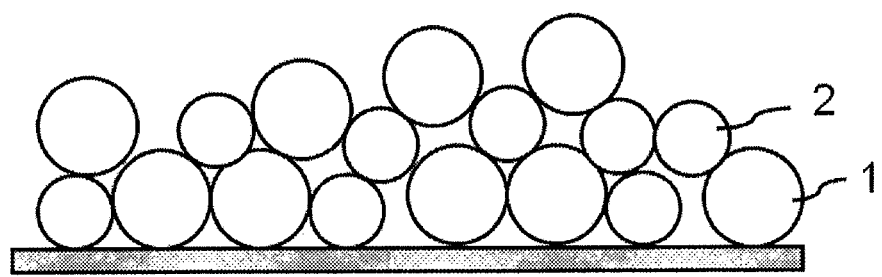
FIG. 1(a) is a schematic diagram of particle stacking in a coating layer including $SiO_2$ particles (first $SiO_2$ particles and second $SiO_2$ particles) of different sizes.

To facilitate understanding the disclosed content of the description herein, several terms are defined below.

A term "about" refers to an acceptable error of a certain value measured by a person of ordinary skill in the art, which partially depends on how to measure or determine the value.

In the present invention, "particle size" refers to an average particle size (an arithmetic average particle size) of particles, which may be obtained, for example, by means of measuring the diameter of multiple particles (more than 100 particles) with a Transmission electron microscope (TEM) and calculating an average value thereof, but it is not limited thereto.

The coating composition of the present invention includes: (A) a polysiloxane resin, including a unit derived from a siloxane monomer, a siloxane oligomer, or a combination thereof; and (B) inorganic particles, including two types of inorganic particles within different particle size ranges. The inorganic particles included in the coating composition of the present invention are inorganic oxide particles containing an element selected from the group consisting of silicon, titanium, zirconium, and a combination thereof, preferably inorganic oxide particle containing silicon, such as $SiO_2$ particles.

The inventor of the present invention found that with the addition of at least two kinds of inorganic particles with different particle sizes into the composition to form a geometric stack, the space of pores are increased and the porosity of the coating layer are increased as well, thereby the optical refractive index of the coating layer can be effectively reduced. According to one embodiment of the present invention, the two types of inorganic particles with different particle sizes include: first $SiO_2$ particles having a particle size within a range from 15 nm to 100 nm, preferably from 16 nm to 50 nm; and second $SiO_2$ particles having a particle size within a range from 3 nm to <15 nm, preferably from 5 nm to 13 nm.

The weight ratio of the first $SiO_2$ particles to the second $SiO_2$ particles is 40:1 to 1:40, preferably 30:1 to 1:30, more preferably 20:1 to 1:20.

In one embodiment of the present invention, the ratio of the weight of the polysiloxane resin to the total weight of the inorganic particles is 20:1 to 1:1, preferably 15:1 to 1.5:1, more preferably 10:1 to 2:1. If the ratio of the weight of the polysiloxane resin to the total weight of the inorganic particles is too high, the effect of light enhancement is not significant; if the ratio is too low, the adhesion of the coating layer is poor. In one embodiment of the present invention, the polysiloxane resin includes a unit derived from a siloxane monomer. The siloxane monomer has a general formula of $(R^1)_nSi(OR^2)_{4-n}$, where $R^1$ is each independently H, phenyl, $C_{1-6}$ alkyl, or a univalent organic group with amino, epoxy, vinyl, an isocyanate group, mercapto or (methyl)acryloyloxy at the end, $R^2$ is each independently $C_{1-3}$ alkyl, and n is an integer from 0 to 3. According to one embodiment of the present invention, $R^1$ is H, methyl, ethyl, vinyl, N-(β-aminoethyl)-γ-aminopropyl, aminopropyl, γ-glycidoxy propyl, β-(3,4-epoxycyclohexy)ethyl, 3-(methylacryloyloxy)propyl or mercaptopropyl; and $R^2$ is methyl or ethyl.

In one embodiment of the present invention, the siloxane monomer is selected from the group consisting of the following compounds: trimethylmethoxysilane, trimethylethoxysilane, dimethyldimethoxysilane, dimethyldiethoxysilane, methyltrimethoxysilane, methyltriethoxysilane, methyltripropoxysilane, tetraethoxysilane, vinyltrimethoxysilane, vinyltriethoxysilane, γ-glycidoxypropyltrimethoxysilane, γ-glycidoxypropyltriethoxysilane, γ-glycidoxypropylmethyldimethoxysilane, γ-glycidoxypropylmethyldiethoxysilane, β-(3,4-epoxycyclohexyl)ethyltrimethoxysilane, 3-(methylacryloyloxy)propyltrimethoxysilane, N-(β-aminoethyl)-γ-aminopropylmethyldimethoxysilane, N-(β-aminoethyl)-γ-aminopropyltrimethoxysilane, γ-aminopropylmethyldiethoxysilane, γ-aminopropyltriethoxysilane, γ-aminopropyltrimethoxysilane, and γ-mercaptopropyltrimethoxysilane.

In one embodiment of the present invention, the polysiloxane resin includes a unit derived from a siloxane oligomer. The siloxane oligomer has a structure of formula (I):

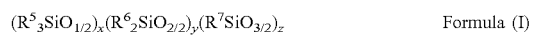

$(R^5{}_3SiO_{1/2})_x(R^6{}_2SiO_{2/2})_y(R^7SiO_{3/2})_z$     Formula (I)

where $R^5$, $R^6$, and $R^7$ are each independently $C_{1-3}$ alkyl (preferably methyl or ethyl), phenyl, —OH or $C_{1-3}$ alkoxy (preferably methoxy or ethoxy); each $R^5$ may be identical or different; each $R^6$ may be identical or different; each $R^7$ may be identical or different; x>0; y>0; and z≥0. According to a preferred embodiment of the present invention, the flexibility of the coating layer will be increased when the polysiloxane resin includes a unit derived from a siloxane oligomer, and therefore, the coating composition of the present invention is useful to a coating layer of a flexible substrate/device for enhancing light transmittance.

According to one embodiment of the present invention, the siloxane oligomer is a compound having a structure of formula (II) or formula (III):

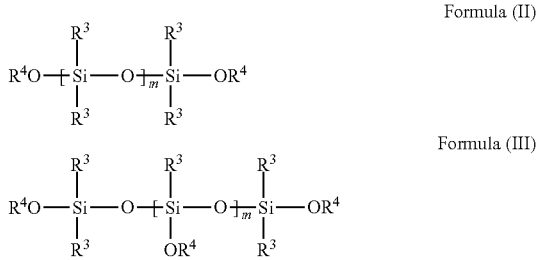

where each $R^3$ may be identical or different and is independently methyl or phenyl; each $R^4$ may be identical or different, and is independently H, methyl or ethyl, preferably methyl; and m is an integer from 2 to 20, preferably an integer from 5 to 12. According to one embodiment of the present invention, the siloxane oligomer used in the present invention is a compound having a structure of formula (II).

In the present invention, there is no special limit to the content of the unit derived from the siloxane monomer, which may comprise, for example, 0 wt %, 10 wt %, 20 wt %, 30 wt %, 40 wt %, 50 wt %, 60 wt %, 70 wt %, 80 wt %, 90 wt % or 100 wt % of the total resin, preferably 50 wt % to 100 wt % of the total resin, and more preferably 70 wt % to 100 wt % of the total resin. In the present invention, there is no special limit to the content of the unit derived from the siloxane oligomer, which may comprise, for example, 0 wt %, 10 wt %, 20 wt %, 30 wt %, 40 wt %, 50 wt %, 60 wt %, 70 wt %, 80 wt %, 90 wt % or 100 wt % of the total resin, and preferably 0 wt % to 70 wt % of the total resin; to provide flexibility, it may comprise, for example, 1 wt % to 50 wt % of the total resin, preferably 2 wt % to 40 wt % of the total resin, and more preferably 3 wt % to 30 wt % of the total resin.

To further reduce the refractive index, in one embodiment of the present invention, the polysiloxane resin may include a unit derived from a fluorine-containing siloxane monomer, thereby resulting in a refractive index gradient distribution, enhancing anti-reflective capability of the coating layer, and then enhancing the transmittance. The fluorine-containing siloxane monomer has a general formula of $CF_3(CF_2)_a(CH_2)_bSi(X)_c(Y)_{3-c}$ or $CH_3(CF_2)_a(CH_2)_bSi(X)_c(Y)_{3-c}$, where a is 0 to 14; b is 1 to 5; c is 0 to 2; X is halogen, preferably fluorine; and Y is $C_{1-3}$ alkoxy (preferably methoxy or ethoxy). There is no special limit to the content of the unit derived from the fluorine-containing siloxane monomer, which may comprise, for example, about 1 wt % to 20 wt % of the total resin, preferably 2 wt % to 12 wt %, and more preferably 3 wt % to 7 wt %.

In one embodiment of the present invention, the fluorine-containing siloxane monomer is selected from the group consisting of the following compounds: trifluoromethylmethyl-triethoxysilane, dodecafluoroheptyl-propyl-trimethoxysilane, 1H,1H,2H,2H-perfluorooctyltriethoxysilane, $C_6F_{13}CH_2CH(CH_3)C_3H_6Si(OCH_3)_3$, dodecafluoroheptylpropyl methyl dimethoxysilane, heptadecafluorodecyltrimethoxysilane, heptadecafluorodecyltriisopropoxysilane and a combination thereof.

As a solar cell module is exposed to outdoor environment for a long term, moisture, dirt or stains in the environment may easily accumulate on a surface of the solar cell module. The porosity of the coating layer may be gradually reduced during usage due to moisture, dirt or stains, which results in that the achieved effect of reducing optical refractive index is not significant, and the transmittance of incident light cannot be effectively enhanced. As a result, in order to have a self-cleaning function, maintain an anti-reflective effect for a long term, and enhance the light transmittance, in one embodiment of the present invention, the inorganic particles further include $TiO_2$ particles. The coating composition not only has an anti-reflective effect and can enhance the light transmittance, but also exhibits a self-cleaning function. Therefore, the coating composition can be effectively used as (but not limited to) an anti-reflective coating layer of a solar cell module/assembly.

In a preferred embodiment of the present invention, the inorganic particles in the coating composition of the present invention further include $TiO_2$ particles. Dirt or stains on the surface of the coating layer formed by the coating composition can be removed due to hydrophilic performance of $TiO_2$ generated after solar irradiation, thereby self-cleaning effect can be achieved. However, although $TiO_2$ particles provide a self-cleaning effect, $TiO_2$ particles have a refractive index up to 2.5 which may reduce the anti-reflective effect of the coating layer. Through repeated research and testing, the inventor of the present invention found that, the overall refractive index of the coating layer formed by the coating composition can be improved by properly adjusting the properties (such as particle size or structure) of $TiO_2$ particles and/or the amount of $TiO_2$ particles in the coating composition, and therefore the above problems can be solved. For example, when the coating composition includes first $SiO_2$ particles, second $SiO_2$ particles and $TiO_2$ particles, adjusting the particle size and/or weight ratio of the above particles may increase the porosity of the coating layer, enhance the light transmittance, and cause the coating composition to form a coating layer having good light transmittance, surface hydrophilicity, and self-cleaning function at the same time. According to one embodiment of the present invention, the ratio of the total weight of the $SiO_2$ particles (i.e., the total weight of the first $SiO_2$ particles and the second $SiO_2$ particles) to the weight of the $TiO_2$ particles is 15:1 to 1:1, preferably 10:1 to 1.5:1, and more preferably 9:1 to 2:1. In one embodiment of the present invention, the $TiO_2$ particles have a particle size of less than 70 nm, preferably 2 nm to 65 nm, more preferably 5 nm to 60 nm.

According to a preferred embodiment of the present invention, the coating composition of the present invention includes:

(A) a polysiloxane resin, including a unit derived from a siloxane monomer and a fluorine-containing siloxane monomer; and (B) inorganic particles, including first $SiO_2$ particles with a particle size ranging from 16 nm to 50 nm, second $SiO_2$ particles with a particle size ranging from 5 nm to 15 nm, and $TiO_2$ particles with a particle size ranging from 5 nm to 60 nm, wherein the ratio of the weight of the polysiloxane resin to the total weight of the inorganic particles is 8:1 to 2:1; the weight ratio of the first $SiO_2$ particles to the second $SiO_2$ particles is 20:1 to 5:1; and the ratio of the total weight of the first $SiO_2$ particles and the second $SiO_2$ particles to the weight of the $TiO_2$ particles is 9:1 to 2:1, and wherein the siloxane monomer and the fluorine-containing siloxane monomer are as defined above.

The coating composition of the present invention may optionally include an additive known to a person of ordinary skill in the art, which includes, for example but is not limited to, pigment, filler, curing agent, curing promotor, ultraviolet absorber, antistatic agent, matting agent, stabilizer, heat dissipation aid, anti-flooding agent, or the like.

The coating composition of the present invention may be applied on a component or a substrate that requires an anti-reflective effect, to form a coating layer for enhancing light transmittance. The composition of the present invention has superior flowability, which is favorable to preparing a thin coating layer for enhancing light transmittance, and therefore, the loss of the light resulted from light absorption by the resin or other components when the light passes through the coating layer can be reduced. Therefore, the coating composition of the present invention is particularly applicable to the display or solar cell's field, and can effectively reduce loss of light due to light reflection, etc., and enhance light transmittance, thereby the efficacy or performance thereof can be further enhanced.

According to one embodiment of the present invention, a polysiloxane resin in the coating composition of the present invention may be prepared by using a sol-gel process. The polysiloxane resin is mixed with inorganic particles in a solvent and the to resulting mixture is then directly applied on a substrate and forms a coating layer for enhancing light transmittance upon heat treatment. There is no special limit to the sequence and timing for adding inorganic particles; in other words, the components may be added and mixed with the polysiloxane resin at the same time or in any order, and may be added during or after the preparation of the polysiloxane resin. For example, in one embodiment of the present invention, the coating composition of the present invention may be prepared by mixing the first $SiO_2$ particles with the siloxane monomer or oligomer in a solvent (such as water or an alcohol solvent) to prepare a polysiloxane resin and then adding the second $SiO_2$ particles, $TiO_2$ particles and an optional solvent (such as an ether solvent).

In principle, there is no special limit to the solvent that can be used in the present invention. The solvent may be a suitable solvent known to a person of ordinary skill in the art, for example, but is not limited to, water, alcohols, benzenes, ethers, esters, ketones, or a combination thereof. Non-limiting examples of the alcohol solvent include methyl alcohol, ethyl alcohol, propyl alcohol, butyl alcohol, isobutyl alcohol, or the like. Non-limiting examples of the benzene solvent include benzene, o-xylene, m-xylene, p-xylene, trimethylbenzene, styrene or the like. Non-limiting examples of the ether solvent include propyl ether, butyl ether, ethylene glycol methyl ether, propylene glycol methyl ether, ethylene glycol methyl ether acetate, propylene glycol methyl ether acetate, diethylene glycol butyl ether acetate (i.e., 2-(2-butoxyethoxy)-ethanol acetate), or the like. Non-limiting examples of the ester solvent include ethyl acetate, butyl acetate, diethyl carbonate, ethyl formate, methyl acetate, ethyl ethoxyacetate, propyl ethoxyacetate, propylene glycol monomethyl ether acetate, or the like. Non-limiting examples of the ketone solvent include acetone, methyl ethyl ketone, methyl isobutyl ketone, or the like.

Among the conventional processes for preparing a coating layer, physical vapor deposition has a disadvantage of high equipment cost; although chemical vapor deposition is faster and cheaper, the formed layer has a poor abrasion resistance. In comparison with the conventional processes, the polysiloxane resin of the coating composition of the present invention is prepared by a sol-gel process and the coating composition can be directly applied on a substrate; therefore, the present invention has the advantages such as lower cost, superior production speed, and being suitable for continuous production. In addition, it is relatively simple to alter the precursor of the chemicals. The coating processes used in the present invention may be any coating process well known to a person of ordinary skill in the art, which include, for example, but are not limited to, knife coating, roller coating, mirco gravure coating, flow coating, dip coating, spray coating, slot die coating, spin coating, and curtain coating. According to one embodiment of the present invention, the coating composition can be applied to two opposing surfaces of a glass substrate by a dipping and pulling-up operation, and the resulting coating layer has the advantages such as a high light transmittance, good adhesion and good abrasion resistance.

In general, after an anti-reflective coating composition is applied on a substrate, a sintering process at a high temperature (600° C. or above) is required for achieving high porosity. The coating composition of the present invention includes inorganic particles having different particle size ranges so that it can introduce more pores to the coating layer to increase the porosity of the coating layer. Therefore, the effect of reducing the refractive index can be achieved in a low-temperature (300° C. or below) process by using the composition of the present invention.

The present invention further relates to a coating layer for enhancing light transmittance, which is formed by the coating composition described above. Specifically, the coating layer for enhancing light transmittance according to the present invention is prepared by applying a coating composition on a substrate to form a coating layer and performing heat treatment (for example, but not limited to, heating for 1 min to 5 min at 150° C. to 700° C.).

There is no special limit to the thickness of the coating layer for enhancing light transmittance. the thickness of the coating layer for enhancing light transmittance mainly depends on the size of inorganic particles and the content of the polysiloxane resin that is required for adhering the inorganic particles to the substrate. According to one embodiment of the present invention, the thickness of a coating layer for enhancing light transmittance obtained after heat treatment is in the range from 50 nm to 500 nm, preferably less than ¼λ (λ: a wavelength within a range from visible light to infrared ray), namely, in the range from 90 nm to 275 nm, more preferably from 100 nm to 200 nm, most preferably from 120 nm to 180 nm.

The substrate used in the present invention may be any transparent substrate that has been known to a person of ordinary skill in the art, such as glass or plastic. There is no special limit to the plastic substrate. The plastic substrate may be, for example, but is not limited to, a polyester resin such as polyethylene terephthalate (PET) or polyethylene naphthalate (PEN); a polymethacrylate resin such as polymethyl methacrylate (PMMA); a polyimide resin; a polystyrene resin; a polycycloolefin resin; a polyolefin resin; a polycarbonate resin; a polyurethane resin; a triacetate cellulose (TAC); or a mixture thereof. The plastic substrate is preferably polyethylene terephthalate, polymethyl methacrylate, polycycloolefin resin or a mixture thereof, more preferably polyethylene terephthalate. There is no special limit to the thickness of the substrate. If the substrate is glass, the thickness thereof is generally between about 0.1 cm and 0.3 cm, and if the substrate is plastic, the thickness thereof is generally between about 5 μm and about 300 μm.

The coating layer for enhancing light transmittance of the present invention has an optical property of increasing total light transmittance by 2% or above, and is applicable in any assembly that requires an increase in total light transmittance, for example, a glass curtain wall of a building, or horticultural glass, so as to improve the light utilization rate. According to one embodiment of the present invention, the coating composition may be applied to a solar cell module or assembly in any manner known to a person of ordinary skill in the art, without altering the design of the solar cell module or assembly. For example, the coating composition can be directly applied on the component (such as a front panel or an encapsulation layer) of a solar cell assembly to form a coating layer for enhancing light transmittance. When light enters into the coating layer for enhancing light transmittance, the total light transmittance is increased and the light is then absorbed and utilized in the component of cell unit such that the electricity generation efficiency is improved.

The following further describes the embodiment of a coating layer for enhancing light transmittance of the present invention with reference to the drawings, but it is not intended to limit the scope of the present invention. Any modifications and variations that can be easily made by a person of ordinary skill in the art shall fall within the scope of the disclosure of this specification.

FIG. 1(a) is a schematic diagram of particle stacking in a coating layer for enhancing light transmittance according to one embodiment of the present invention. The coating layer includes SiO$_2$ particles with different particle sizes, including first SiO$_2$ particles (1) with a larger particle size and second SiO$_2$ particles (2) with a smaller particle size.

Figure 1B:
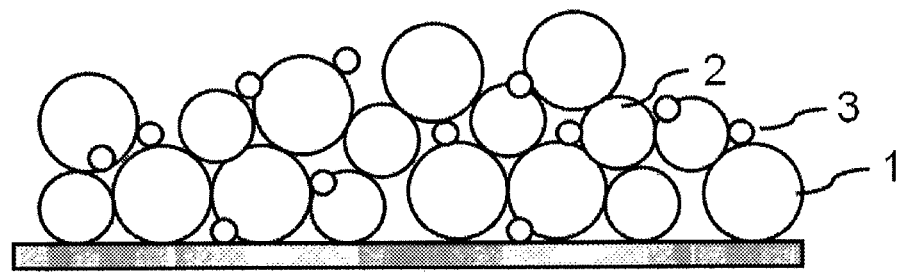
FIG. 1(b) is a schematic diagram of particle stacking in a coating layer including $SiO_2$ particles (first $SiO_2$ particles and second $SiO_2$ particles) of different sizes and $TiO_2$ particles.

FIG. 1(b) is a schematic diagram of particle stacking in a coating layer for enhancing light transmittance according to another embodiment of the present invention. The coating layer includes SiO$_2$ particles with different particle sizes, including first SiO$_2$ particles (1) with a larger particle size and second SiO$_2$ particles (2) with a smaller particle size, and includes TiO$_2$ particles (3).

Figure 2:
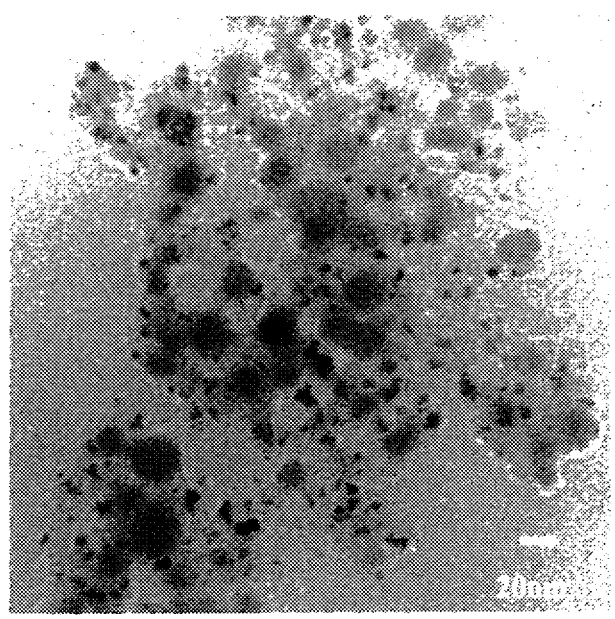
FIG. 2 is a TEM diagram in which the particle sizes and distribution in a coating layer including $SiO_2$ particles (first $SiO_2$ particles and second $SiO_2$ particles) of different sizes and $TiO_2$ particles are observed.

FIG. 2 is a TEM diagram in which the particle sizes and distribution in a coating layer including SiO$_2$ particles (first SiO$_2$ particles and second SiO$_2$ particles) of different sizes and TiO$_2$ particles are observed. It can be observed from FIG. 2 that the SiO$_2$ particles and TiO$_2$ particles are evenly distributed in the coating composition.

The following embodiments are only used to further describe the present invention rather than limit the scope thereof. Any modifications and variations that can be easily made by a person skilled in the art shall fall within the scope of the disclosure of this specification and the scope of the appended claims.

PREPARATION EXAMPLES

Siloxane monomer(s)/oligomer(s), an aqueous solution of first SiO$_2$ particles, and solvent(s) were pre-mixed according to the proportions (gram weight) shown in Table 1 and agitated. Then, in the presence of nitrogen, the mixtures were heated to 75±2° C. for reaction over 6 hours, to prepare compositions a, b, c, d and e.

TABLE 1

| Preparation examples | Composition a | Composition b | Composition c | Composition d | Composition e |
|---|---|---|---|---|---|
| Methyltrimethoxysilane (DOW CORNING ® Z-6070 SILANE) | 49.1 | 49.1 | 49.1 | 49.1 | 0 |
| Tetraethoxysilane (DOW CORNING ® Z-6697 SILANE) | 149.8 | 149.8 | 150 | 149.8 | 149.8 |
| γ-glycidoxypropyltrimethoxysilane (DOW CORNING ® Z-6040 SILANE)) | 85.1 | 85.1 | 85.1 | 85.1 | 85.1 |
| Dodecafluoroheptyl-propyl-trimethoxysilane (XEOGIA G502) | 8.5 | 0 | 29 | 8.5 | 8.5 |
| Siloxane oligomer (Dow Corning 3074) (Note 4) | | | | | 73 |
| Isopropyl alcohol | 98.7 | 98.7 | 82.8 | 98.7 | 98.7 |
| Water | 0 | 0 | 0 | 142.4 | 0 |
| Aqueous solution of first SiO$_2$ particles (solids content: 20%) (Nissan snowtex-o: 17 nm~22 nm) | 178 | 178 | 178 | 0 | 293.9 |
| Total weight | 569.2 | 560.7 | 574 | 533.6 | 709 |
| Total weight of solids | 187.8 | 185 | 192.9 | 170.6 | 173 |
| Total solids content (Note 1) | 33% | 33% | 33.6% | 32% | 24.4% |
| SiO$_2$/total solids content (Note 2) | 18.96% | 19.24% | 18.4% | 0 | 33.98% |
| Weight of resin/total solids content (Note 3) | 81.04% | 80.76% | 81.6 | 100% | 66.02% |

Note 1:
Total solids content is the proportion (weight ratio) of all solids in the composition. For example, the composition was weighed to obtain an actual weight "a" (total weight), and then heated to remove the solvent (for example, for a 1 gram composition, heated it by using a hot plate at 150° C. for 30 min) and weighed again to obtain weight "b" (total weight of solids); the total solids content (%) is "b/a."
Note 2:
SiO$_2$/total solids content is the proportion (%) of the SiO$_2$ solids in the total solids. For example, in Composition a, the weight of the solids in the aqueous solution of first SiO$_2$ particles is 178*20% = 35.6 g; the total weight of solids in the composition is 187.8 g; and SiO$_2$/total solids content is 35.6/187.8*100% = 18.96%.
Note 3:
Weight of resin/total solids content is the proportion (%) of the solids of the resin in the total solids. "Weight of resin/total solids content "+" SiO$_2$/total solids content = 100%.
Note 4:
Dow Corning 3074 (molecular weight of 100-1500):

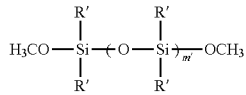

wherein R' is methyl or phenyl, the molar ratio of methyl to phenyl in R' is 1:1, and m' is an integer of about 5 to 10.

<Preparation of a Coating Composition>

Compositions a, b, c, d and e as prepared above were added into a bottle along with an aqueous solution of second SiO$_2$ particles, an aqueous solution of TiO$_2$ particles, and solvents according to the proportions (gram weight) shown in Table 2-1, Table 2-2 and Table 2-3. The resulting mixture was then agitated evenly to prepare the coating composition.

TABLE 2-1

|  |  | Ex. 1 | Ex. 2 (Comparative) | Ex. 3 (Comparative) | Ex. 4 | Ex. 5 | Ex. 6 |
|---|---|---|---|---|---|---|---|
| Composition | a | 23.3 | 23.3 | 0 | 23.3 | 23.3 | 0 |
|  | b | 0 | 0 | 0 | 0 | 0 | 0 |
|  | c | 0 | 0 | 0 | 0 | 0 | 22.7 |
|  | d | 0 | 0 | 23.3 | 0 | 0 | 0 |
| Inorganic particles | Aqueous solution of second $SiO_2$ particles (solids content: 2%) (Eternal E4501: 8 nm~12 nm) | 6.3 | 0 | 72.5 | 4.5 | 40 | 5.5 |
|  | An aqueous solution of $TiO_2$ particles (solids content: 13%) (Eternal E4500: 2 nm~12 nm) | 0 | 0 | 0 | 0 | 0 | 0 |
| Solvent | Ethylene glycol methyl ether | 102.3 | 102.3 | 1023 | 102.3 | 102.3 | 108.2 |
|  | 2-(2-butoxyethoxy)-ethanol acetate | 18.1 | 18.1 | 18.1 | 18.1 | 18.1 | 19.1 |

TABLE 2-2

|  |  | Ex. 7 | Ex. 8 | Ex. 9 | Ex. 10 | Ex. 11 |
|---|---|---|---|---|---|---|
| Composition | a | 0 | 23.3 | 23.3 | 23.3 | 23.3 |
|  | b | 23.1 | 0 | 0 | 0 | 0 |
|  | c | 0 | 0 | 0 | 0 | 0 |
|  | d | 0 | 0 | 0 | 0 | 0 |
| Inorganic particles | Aqueous solution of second $SiO_2$ particles (solid content: 2%) (Eternal E4501: 8 nm~12 nm) | 6 | 6.3 | 6.35 | 11.1 | 6 |
|  | Aqueous solution of $TiO_2$ particles (solid content: 13%) (Eternal E4500: 2 nm~12 nm) | 1.3 | 1.46 | 2.4 | 4 | 4.8 |
| Solvent | Ethylene glycol monomethyl ether | 107.8 | 102.3 | 119.7 | 107.7 | 107.7 |
|  | 2-(2-butoxyethoxy)-ethanol acetate | 19.1 | 18.1 | 21.2 | 19 | 19 |

TABLE 2-3

|  |  | Ex. 12 | Ex. 13 (Comparative) | Ex. 14 (Comparative) |
|---|---|---|---|---|
| Composition | a | 0 | 23.3 | 23.3 |
|  | b | 0 | 0 | 0 |
|  | c | 0 | 0 | 0 |
|  | d | 0 | 0 | 0 |
|  | e | 30.7 | 0 | 0 |
| Inorganic particles | Aqueous solution of second $SiO_2$ particles (solid content: 2%) (Eternal E4501: 8 nm~12 nm) | 17.2 | 11.1 | 11.1 |
|  | Aqueous solution of $TiO_2$ particles (solid content: 13%) | 0 | 13.4 (Eternal E4500: 2 nm~12 nm) | 4 (Eternal E4500: 90 nm~115 nm) |
| Solvent | Ethylene glycol monomethyl ether | 91.9 | 121.1 | 107.7 |
|  | 2-(2-butoxyethoxy)-ethanol acetate | 10.2 | 21.5 | 19 |

The proportional of the components in the example and comparative examples are listed in Table 3-1, Table 3-2 and Table 3-3.

TABLE 3-1

|  |  | Ex. 1 | Ex. 2 (Comparative) | Ex. 3 (Comparative) | Ex. 4 | Ex. 5 | Ex. 6 |
|---|---|---|---|---|---|---|---|
| Inorganic particles | First $SiO_2$ particles (grams) | 1.45 | 1.45 | 0 | 1.45 | 1.45 | 1.4 |
|  | Second $SiO_2$ particles (grams) | 0.126 | 0 | 1.45 | 0.09 | 0.8 | 0.11 |

TABLE 3-1-continued

|  | Ex. 1 | Ex. 2 (Comparative) | Ex. 3 (Comparative) | Ex. 4 | Ex. 5 | Ex. 6 |
|---|---|---|---|---|---|---|
| $TiO_2$ particles (grams) | 0 | 0 | 0 | 0 | 0 | 0 |
| Resin (grams) (solvent excluded) | 6.24 | 6.24 | 7.5 | 6.24 | 6.24 | 6.24 |
| Resin/Inorganic particles | 3.96 (6.24/1.576) | 4.3 (6.24/1.45) | 5.17 (7.5/1.45) | 4.05 (6.24/1.54) | 2.77 (6.24/2.25) | 4.13 (6.24/1.51) |
| First $SiO_2$/Second $SiO_2$ | 11.5 | — | 0 | 16 | 1.8 | 12.7 |
| Total $SiO_2/TiO_2$ | — | — | — | — | — | — |

TABLE 3-2

|  |  | Ex. 7 | Ex. 8 | Ex. 9 | Ex. 10 | Ex. 11 |
|---|---|---|---|---|---|---|
| Inorganic particles | First $SiO_2$ particles (grams) | 1.47 | 1.45 | 1.45 | 1.45 | 1.45 |
|  | Second $SiO_2$ particles (grams) | 0.12 | 0.126 | 0.127 | 0.222 | 0.12 |
|  | $TiO_2$ particles (grams) | 0.169 | 0.19 | 0.31 | 0.52 | 0.63 |
| Resin (grams) (solvent excluded) |  | 6.15 | 6.24 | 6.24 | 6.24 | 6.24 |
| Resin/inorganic particles |  | 3.5 (6.15/1.759) | 3.53 (6.24/1.766) | 3.31 (6.24/1.887) | 2.85 (6.24/2.192) | 2.84 (6.24/2.2) |
| First $SiO_2$/Second $SiO_2$ |  | 12.25 | 11.5 | 11.4 | 6.5 | 12.1 |
| Total $SiO_2/TiO_2$ |  | 9.4 | 8.3 | 5.1 | 3.2 | 2.5 |

TABLE 3-3

|  |  | Ex. 12 (Comparative) | Ex. 13 (Comparative) | Ex. 14 |
|---|---|---|---|---|
| Inorganic particles | First $SiO_2$ particles (grams) | 2.54 | 1.45 | 1.45 |
|  | Second $SiO_2$ particles (grams) | 0.344 | 0.222 | 0.222 |
|  | $TiO_2$ particles (grams) | 0 | 1.74 | 0.52 |
| Resin (grams) (solvent excluded) |  | 4.95 | 6.24 | 6.24 |
| Resin/inorganic particles |  | 1.72 (4.95/2.884) | 1.83 (6.24/3.412) | 2.85 (6.24/2.192) |
| First $SiO_2$/Second $SiO_2$ |  | 7.38 | 6.5 | 6.5 |
| Total $SiO_2/TiO_2$ |  | — | 0.96 | 3.2 |

<Preparation of a Coating Layer for Enhancing Light Transmittance>

Each of the coating compositions prepared in the examples and comparative examples were applied on a 1 mm glass sheet by using a dip coating apparatus at a pulling-up speed of 2.1 cm/min. The coated glass sheet was then baked at 200° C. for 2 min. The thickness of the coating layer was about 0.125 μm.

<Property Testing>

Various tests, including those for transmittance, solvent resistance, alcohol resistance, adhesion, hardness, contact angle and reliability, were performed on the coating layers. The tests are described in detail as follows:

Transmittance: The transmittance of the sample at a wavelength of 550 nm (the wavelength which the human eye is most sensitive to) was measured by using PerkinElmer Lambda 900 and was recorded in Table 4. The transmittance of a 1 mm glass sheet that had not been coated was used as a standard and considered as 100%.

Solvent resistance: After being wetted by xylene and methyl ethyl ketone and wiped back and forth for 150 times, observe whether there is any damage to the coating layer.

Alcohol resistance: After being wetted by alcohol and wiped back and forth for 150 times, observe whether there is any damage.

Adhesion: Perform a cross cut adhesion test using a 3M Scotch 600 adhesive tape.

Hardness: Test the hardness of the coating layer by using a Mitsubishi standard hardness testing pencil under a load of 1 kg.

Contact angle: Add water dropwise on a surface of the sample and measure a dynamic contact angle using a contact angle meter of KRUSS company. Contact angle was obtained by taking an average value of five tested points.

The results of were listed in Table 4.

TABLE 4

|  | Transmittance | Solvent resistance | Alcohol resistance | Adhesion | Hardness | Contact angle | Remarks |
|---|---|---|---|---|---|---|---|
| Ex. 1 | 108.6 | pass | pass | pass | >7H | <30 | Including first and second $SiO_2$ particles |

TABLE 4-continued

| | Transmittance | Solvent resistance | Alcohol resistance | Adhesion | Hardness | Contact angle | Remarks |
|---|---|---|---|---|---|---|---|
| Ex. 2 (Comparative) | 104 | pass | pass | pass | >7H | <30 | Including first $SiO_2$ particles |
| Ex. 3 (Comparative) | 102.3 | pass | pass | pass | >7H | <30 | Including second $SiO_2$ particles |
| Ex. 4 | 106.1 | pass | pass | pass | >7H | <30 | First $SiO_2$/Second $SiO_2$ = 16 |
| Ex. 5 | 105 | pass | pass | pass | >7H | <30 | First $SiO_2$/Second $SiO_2$ = 1.8 |
| Ex. 6 | 104.6 | pass | pass | pass | >7H | <30 | Composition c, no $TiO_2$ |
| Ex. 7 | 103.7 | pass | pass | pass | >7H | <30 | Composition b, total $SiO_2/TiO_2$ = 9.4 |
| Ex. 8 | 107.4 | pass | pass | pass | >7H | <30 | Composition a, total $SiO_2/TiO_2$ = 8.3 |
| Ex. 9 | 106.6 | pass | pass | pass | >7H | <30 | Composition a, total $SiO_2/TiO_2$ = 5.1 |
| Ex. 10 | 103.3 | pass | pass | pass | >7H | <30 | Composition a, total $SiO_2/TiO_2$ = 3.2 |
| Ex. 11 | 102.8 | pass | pass | pass | >7H | <30 | Composition a, total $SiO_2/TiO_2$ = 2.5 |
| Ex. 12 | 105.5 | pass | pass | pass | 6~7H | <30 | Composition e, First $SiO_2$/Second $SiO_2$ = 7.38 |
| Ex. 13 (Comparative) | 97 | pass | pass | pass | >7H | <30 | Composition a, total $SiO_2/TiO_2$ = 0.96 |
| Ex. 14 (Comparative) | 100.2 | pass | pass | pass | >7H | <30 | Composition a, $TiO_2$ particles 90 nm~115 nm |

FIG. 3(a) to FIG. 3(d) are respectively transmittance spectrums for the coating compositions of Examples 1, Comparative Example 2 and Comparative Example 3, the coating compositions of Examples 1, 4 and 5, the coating compositions of Examples 1 and 6, and the coating compositions of Examples 7 to 11 within the wavelength range of visible light measured by using PerkinElmer Lambda 900 as stated above after the resulting coating layers were prepared by a dipping and pulling up process at a pulling-up speed of 2.1 cm/min.

Figure 3A:
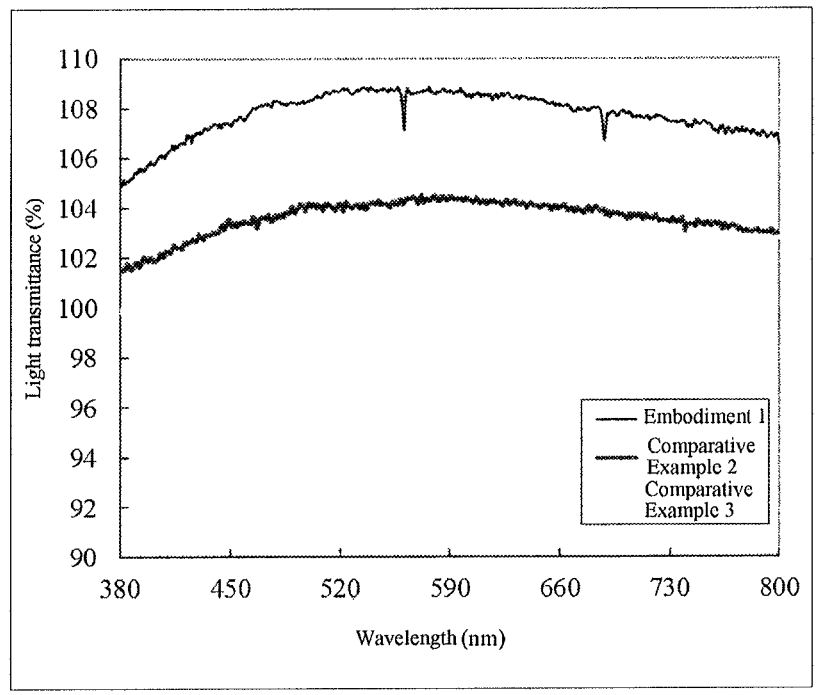
FIG. 3(a) is a transmittance spectrum measured for the coating layer of Example 1 (Embodiment 1), Comparative Example 2, and Comparative Example 3.
Figure 3B:
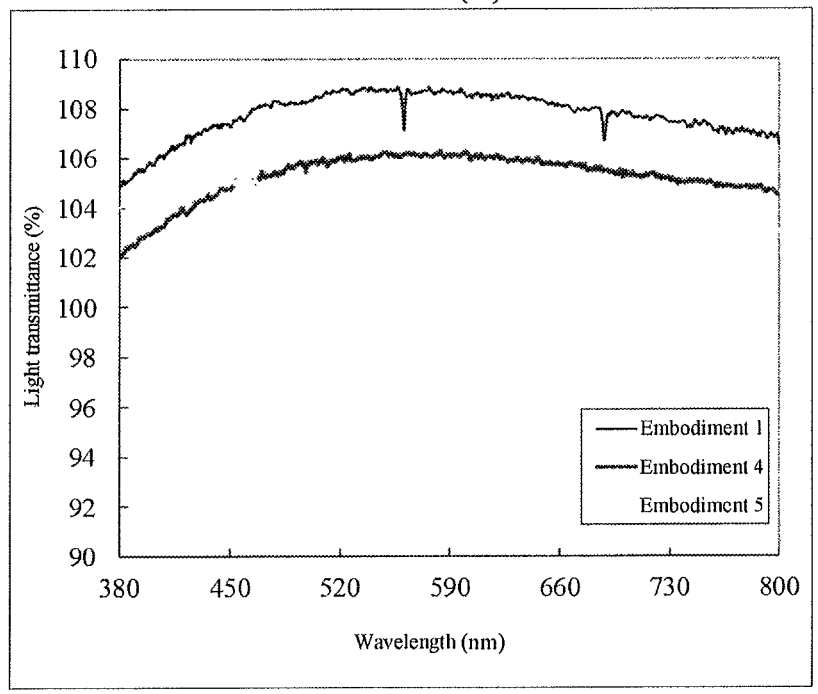
FIG. 3(b) is a transmittance spectrum measured for the coating layer of Examples 1, 4 and 5 (Embodiments 1, 4 and 5)
Figure 3C:
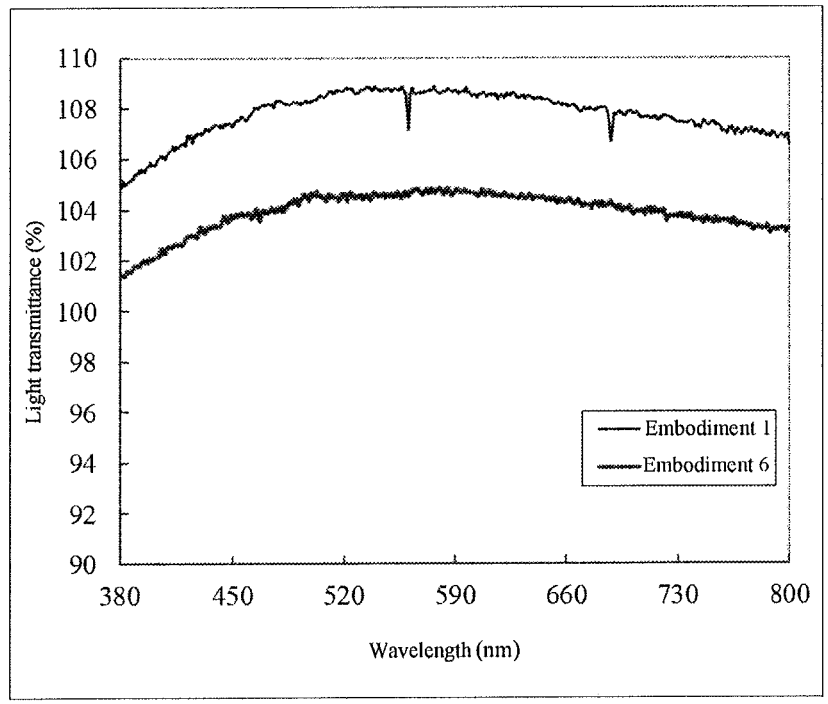
FIG. 3(c) is a transmittance spectrum measured for the coating layer of Examples 1 and 6 (Embodiments 1 and 6)
Figure 3D:
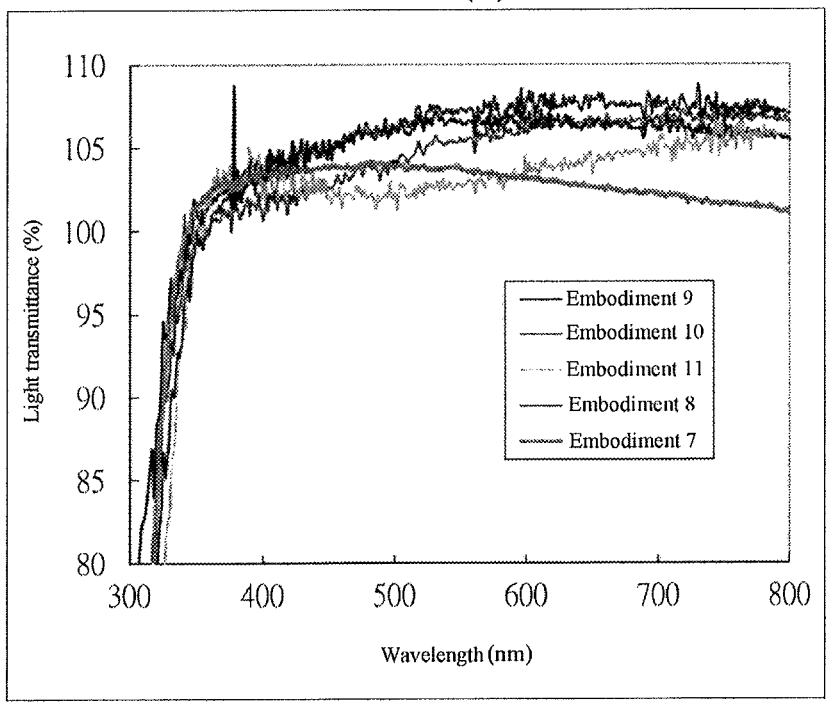
FIG. 3(d) is a transmittance spectrum measured for the coating layer of Examples 7 to 11 (Embodiments 7 to Embodiment 11).

Influence of Adding $SiO_2$ Particles with Different Particle Sizes on the Property of the Coating Layer:

In view of Examples 1 and 4 to 6, Comparative Example 2 and Comparative Example 3, transmittance of the coating layer to which first $SiO_2$ particles and second $SiO_2$ particles were added is superior than that of the coating layer to which only first $SiO_2$ particles (Comparative Example 2) or second $SiO_2$ particles (Comparative Example 3) were added. From the transmittance spectrum of Example 1, Comparative Example 2 and Comparative Example 3 as shown in FIG. 3(a), it is obvious that transmittance of the coating layer in Example 1 (that is, simultaneously adding first $SiO_2$ particles and second $SiO_2$ particles), is higher than that of the coating layer in Comparative Example 2 (that is, only adding first $SiO_2$ particles) or that of the coating layer in Comparative Example 3 (only adding second $SiO_2$ particles).

Influence of Adding $TiO_2$ Particles on the Property of the Coating Layer:

In Examples 7 to 11, different proportions of TiO2 having a particle size less than 70 nm were added; the resulting transmittance were effectively increased by 2% or more. The results of FIG. 3(d) also shows that the coating layers of Examples 7 to 11 that include $TiO_2$ particles have the effect of enhancing light transmittance (transmittance>100%) within the wavelength range of visible light.

In Examples 1, 8 and 9, the ratios of first $SiO_2$ particles to second $SiO_2$ particles were similar (11.4~41.5). The coating layer of Example 1 did not contain $TiO_2$ particles while the coating layers of Examples 8 and 9 contained $TiO_2$ particles a particle size less than 70 nm. The transmittance obtained in Examples 1, 8 and 9 was respectively 108.6%, 107.4%, and 106.6%.

The components and proportions in Example 10 and Comparative Example 14 were similar while the $TiO_2$ particles used in Comparative Example 14 have a particle size greater than 70 nm. The transmittance obtained in Example 10 and Comparative Example 14 was respectively 103.3% and 100.2%. It is evident that the effect of enhancing light transmittance would be affected when the $TiO_2$ particles were too large.

In view of the above results, it can be known that the present invention can be practiced with or without the addition of $TiO_2$ particles. Although use of $TiO_2$ particles may affect the effect of enhancing light transmittance, such effect can be still achieved by controlling the particle size of $TiO_2$ particles within a proper range (i.e., less than 70 nm) and the self-cleaning function can be provided due to the presence of $TiO_2$ particles.

Influence of the Content of $TiO_2$ Particles on the Property of the Coating Layer:

The components and proportions in Example 10 and Comparative Example 13 were similar while the content of $TiO_2$ particles used in Comparative Example 13 was too high. The transmittance obtained in Example 10 and Comparative Example 13 was respectively 103.3% and 97%. It is evident that the effect of enhancing light transmittance would be affected when the content of $TiO_2$ particles was too high.

Influence of the Ratio of First SiO$_2$ Particles to Second SiO$_2$ Particles on the Property of the Coating Layer:

The coating layers of Examples 1, 4 and 5 include first SiO$_2$ particles and second SiO$_2$ particles. The coating layer of Example 5 has the highest content (0.8 grams) of the second SiO$_2$ particles, followed by that (0.126 grams) of Example 1. In Examples 1, 4 and 5, the ratios of first SiO$_2$ particles to second SiO$_2$ particles are respectively 11.5, 16 and 1.8 (the t transmittance was respectively enhanced by 8.6%, 6.1% and 5%). From the results shown in FIG. 3(b), it can also be known that, the coating layer having a ratio of first SiO$_2$ particles to second SiO$_2$ particles in the range as defined in the present invention has the effect of enhancing light transmittance.

Influence of Adding a Fluorine-Containing Siloxane Monomer on the Property of the Coating Layer:

The resin of Example 7 did not include a unit derived from a fluorine-siloxane monomer, and the composition of Example 7 can effectively enhance the light transmittance by 3.7%. The components and proportions in Example 8 are similar to those of Example 7, but the resin in Example 8 included a unit derived from a fluorine-siloxane monomer and the light transmittance of the resulting coating layer is enhanced by 7.4%, which shows that use of a fluorine-containing siloxane monomer can further enhance the light transmittance.

In addition, a fluorine-containing siloxane monomer was used in both the resins of Examples 1 and 6. From the results of Table 4 and FIG. 3(c), it can be known that Examples 1 and 6 can achieve the effect of enhancing light transmittance of the coating layer.

Influence of Adding a Siloxane Oligomer on the Property of the Coating Layer:

A siloxane oligomer was used in the resin of Example 12. The flexibility of the resulting coating layer was enhanced and the transmittance was effectively enhanced by 5.5%, and therefore, such layer is useful to a coating layer of a flexible substrate/device for enhancing light transmittance.

What is claimed is:

1. A coating composition for enhancing light transmittance, consisting essentially of:
   (A) a polysiloxane resin derived from a siloxane monomer, a siloxane oligomer, or a combination thereof; and
   (B) inorganic solid particles, comprising first SiO$_2$ particles with a particle size ranging from 16 nm to 50 nm, second SiO$_2$ particles with a particle size ranging from 5 nm to 15 nm, and TiO$_2$ particles with a particle size of less than 70 nm, wherein the weight ratio of the first SiO$_2$ particles to the second SiO$_2$ particles is 20:1 to 5:1, and the ratio of the weight of the polysiloxane resin to the total weight of the inorganic particles is 20:1 to 2:1, and wherein the ratio of the total weight of the first SiO$_2$ particles and the second SiO$_2$ particles to the weight of the TiO$_2$ particles is 15:1 to 1:1.

2. The coating composition according to claim 1, wherein the siloxane monomer has a general formula of $(R^1)_n Si(OR^2)_{4-n}$, wherein $R^1$ is each independently H, phenyl, C$_{1-6}$ alkyl, or a univalent organic group with amino, epoxy, vinyl, an isocyanate group, mercapto or (methyl)acryloyloxy at the end; $R^2$ is each independently C$_{1-3}$ alkyl; and n is an integer from 0 to 3.

3. The coating composition according to claim 2, wherein $R^1$ is each independently H, methyl, ethyl, vinyl, N-(β-aminoethyl)-γ-aminopropyl, aminopropyl, γ-glycidoxy propyl, β-(3,4-epoxycyclohexyl)ethyl, 3-(methylacryloyloxy) propyl or mercaptopropyl; and $R^2$ is each independently methyl or ethyl.

4. The coating composition according to claim 1, wherein the siloxane monomer is selected from the group consisting of the following compounds:
trimethylmethoxysilane, trimethylethoxysilane, dimethyldimethoxysilane, dimethyldiethoxysilane, methyltrimethoxysilane, methyltriethoxysilane, methyltripropoxysilane, tetraethoxysilane, vinyltrimethoxysilane, vinyltriethoxysilane, γ-glycidoxypropyltrimethoxysilane, γ-glycidoxypropyltriethoxysilane, γ-glycidoxypropylmethyldimethoxysilane, γ-glycidoxypropylmethyldiethoxysilane, β-(3,4-epoxycyclohexyl)ethyltrimethoxysilane, 3-(methylacryloyloxy)propyltrimethoxysilane, N-(β-aminoethyl)-γ-aminopropylmethyldimethoxysilane, N-(β-aminoethyl)-γ-aminopropyltrimethoxysilane, γ-aminopropylmethyldiethoxysilane, γ-aminopropyltriethoxysilane, g-aminopropyltrimethoxysilane, and γ-mercaptopropyltrimethoxysilane.

5. The coating composition according to claim 1, wherein the siloxane oligomer has a structure of formula (I):
$(R^5_3 SiO_{1/2})_x (R^6_2 SiO_{2/2})_y (R^7 SiO_{3/2})_z$: (I)
wherein, $R^5$, $R^6$, and R are each independently C$_{1-3}$ alkyl, phenyl, —OH or C$_{1-3}$ alkoxy; each $R^5$ may be identical or different; each $R^6$ may be identical or different; each $R^7$ may be identical or different; x>0, y>0, and z≥0.

6. The coating composition according to claim 5, wherein the siloxane oligomer is a compound having a structure of formula (II) or formula (III):

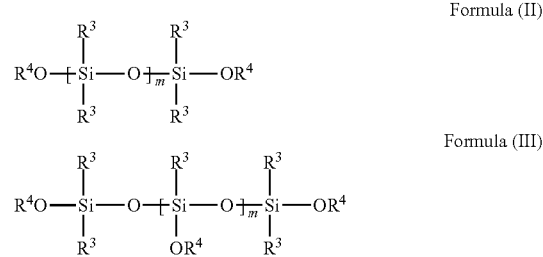

Formula (II)

Formula (III)

wherein each $R^3$ may be identical or different, and is independently methyl or phenyl; each $R^4$ may be identical or different, and is independently H, methyl or ethyl; and m is an integer from 2 to 20.

7. The coating composition according to claim 1, wherein the polysiloxane resin further comprises a unit derived from a fluorine-containing siloxane monomer.

8. The coating composition according to claim 7, wherein the fluorine-containing siloxane monomer has a general formula of
$CF_3(CF_2)_a(CH_2)_b Si(X)_c(Y)_{3-c}$ or $CH_3(CF_2)_a(CH_2)_b Si(X)_c(Y)_{3-c}$, wherein a is 0 to 14, b is 1 to 5, c is 0 to 2, X is halogen, and Y is C$_{1-3}$ alkoxy.

9. The coating composition according to claim 8, wherein the fluorine-containing siloxane monomer is trifluoromethyl-methyl triethoxysilane, dodecafluoroheptyl-propyl-trimethoxysilane, 1H,1H,2H,2H-perfluorooctyltriethoxysilane, $C_6F_{13}CH_2CH(CH_3)C_3H_6Si(OCH_3)_3$, dodecafluoroheptylpropyl methyl dimethoxysilane, heptadecafluorodecyltrimethoxysilane, heptadecafluorodecyltriisopropoxysilane, or a combination thereof.

10. A coating layer for enhancing light transmittance, consisting essentially of:
   (A) a polysiloxane resin derived from a siloxane monomer, a siloxane oligomer, or a combination thereof; and (B) inorganic solid particles, comprising first $SiO_2$ particles with a particle size ranging from 16 nm to 50 nm, second $SiO_2$ particles with a particle size ranging from 5 nm to 15 nm, and $TiO_2$ particles with a particle size of less than 70 nm, wherein the weight ratio of the first $SiO_2$ particles to the second $SiO_2$ particles is 20:1 to 5:1, and the ratio of the weight of the polysiloxane resin to the total weight of the inorganic particles is 20:1 to 2:1, and wherein the ratio of the total weight of the first $SiO_2$ particles and the second $SiO_2$ particles to the weight of the $TiO_2$ particles is 15:1 to 1:1.

11. The coating layer according to claim 10 having a thickness in the range from 50 nm to 500 nm.

12. The coating layer according to claim 11 having a thickness in the range from 120 nm to 180 nm.

13. The coating layer according to claim 11, wherein the coating layer has a light transmittance that is enhanced as compared with a light transmittance of the coating layer comprising the first $SiO_2$ particles or the second $SiO_2$ particles only.

14. The coating composition according to claim 1, wherein the coating composition can be heated to form a coating layer having a light transmittance that is enhanced as compared with a light transmittance of the coating layer comprising the first $SiO_2$ particles or the second $SiO_2$ particles only.

15. The coating composition according to claim 1, wherein the polysiloxane resin consists of units selected from the group consisting of siloxane monomer, siloxane oligomer and a combination thereof.

16. The coating layer according to claim 10, wherein the polysiloxane resin consists of units selected from the group consisting of siloxane monomer, siloxane oligomer and a combination thereof.

\* \* \* \* \*